United States Patent Office 3,629,169
Patented Dec. 21, 1971

3,629,169
WATER-MODIFIED POLYESTER COMPOSITIONS
Leon B. Bedighian, Los Angeles, Calif., assignor to Vistron Corporation, Cleveland, Ohio
No Drawing. Filed June 18, 1969, Ser. No. 834,497
Int. Cl. C08f 21/02, 21/04
U.S. Cl. 260—22 CB   9 Claims

ABSTRACT OF THE DISCLOSURE

Curable water-oil emulsions comprising a mixture of an unsaturated polyester, copolymerizable monomer, nonionic emulsifier, water, a thixotropic thickener, a basic neutralizing agent and a polymerization initiator.

---

The present invention is concerned with certain water-polyester mixtures and more particularly pertains to water-polyester emulsions which can be shaped or cast into various forms and cured to produce useful shaped articles.

Water-in-oil emulsions in which the oil phase is an unsaturated polyester resin/copolymerizable monomer (i.e., styrene) have previously been described in Netherlands patent publication 6714220. These prior art emulsions must be prepared with an emulsifier having an HLB value of 2–8. The emulsions may be hardened by adding the usual free-radical curing agents and heating to form a rigid material having high compressive strength and fire-retardant properties.

The water-in-oil emulsions of the present invention can be conveniently prepared by combining (1) a polyester-copolymerizable monomer mixture, (2) a thixotropic thickener for the polyester-monomer mixture, (3) a non-ionic emulsifier having no particular HLB limitation, (4) a basic neutralizing agent to neutralize partially the residual acidic groups in the polyester, (5) a promoter or a mixture of promoters, (6) a catalyst or polymerization initiator, (7) water, and optionally (8) dyes or pigments. Preferably from about 10 to 240 parts by weight of water is present per 100 parts by weight of the polyester-copolymerizable monomer mixture in the emulsions of this invention.

The polyesters useful in the present invention are preferably unsaturated polyesters of the well known types. The preferred polyesters in the present invention are those containing sufficient olefinic unsaturation so as to be thermosetting, and this olefinic unsaturation may be present in the polyesters in the form of unsaturated dibasic acid moieties. The other portions of the preferred polyester molecules may be composed of saturated dibasic acid, aliphatic polyhydric alcohol and aromatic polyhydric alcohol moieties. Illustrative unsaturated dibasic acids and anhydrides, saturated dibasic acids and anhydrides, aliphatic polyhydric alcohols and aromatic polyhydric alcohols useful in the preparation of the preferred polyesters of the present invention include the following:

Unsaturated dibasic acids and anhydrides
maleic acid
chloromaleic acid
ethyl maleic acid
maleic anhydride
citraconic anhydride
muconic acid
fumaric acid
aconitic acid
mesaconic acid
itaconic acid
tetrahydrophthalic acid Saturated dibasic acids and anhydrides
adipic acid
azelaic acid
sebacic acid
dodecyl succinic acid
succinic acid
tetrahlorophthalic anhydride
phthalic anhydride
phthalic acid
isophthalic acid
hexahydrophthalic anhydride
malonic acid
citric acid Aliphatic polyhydric alcohols
ethylene glycol
propylene glycol
trimethylene glycol
triethylene glycol
pentaethylene glycol
polyethylene glycol
1,4-butanediol
diethylene glycol
dipropylene glycol
2,2-dimethyl-1,3-propanediol
hexamethylene glycol
1,4-cyclohexane dimethanol Aromatic polyhydric alcohols
xylene alcohols
ethyl resorcinol
propyl resorcinol
2,4-dimethyl resorcinol
3,6-dimethyl-1,2,4-benzenetriol
ethyl pyrogallol
2,4-methyl-1,4-dihydroxy naphthalene
3-methyl-1,4,5-naphthalene triol
dimethylol toluene
dimethylol xylene
bis-hydroxy ethyl or bis-hydroxy propyl ethers of resorcinol, catechol, hydroquinones
1,5-dihydroxynaphthalene
4,,4'-isopropylidene-bis-phenol, etc.

The copolymerizable monomers used in conjunction with the unsaturated polyesters in this invention are liquid vinyl monomers which act as solvents for the polyester and give pourable solutions in admixture with the polyester. Useful copolymerizable monomers include styrene, substituted styrenes such as alpha-methyl styrene, vinyl toluenes, vinyl xylenes, nuclear halogenated styrenes such as o-chlorostyrene, p-chlorostyrene, m-chlorostyrene, mixtures thereof, the corresponding bromostyrenes, liquid acrylic esters, methacrylic esters and the like. Most preferred is styrene. The weight ratio of unsaturated polyester to copolymerizable monomer is preferably from about 50:50 to 75:25.

Thixotropic thickeners for the polyester-monomer mixture include inorganic and organic compounds such as fumed silica, magnesium silicates, aluminum silicates, castor oil derivatives, starch and starch derivatives, and natural and synthetic water-soluble gums. Preferably the thixotropic thickener is present in from about 0.25 to 4 parts by weight per 100 parts by weight of combined unsaturated polyester-copolymerizable monomer.

Basic neutralizing agents which can be used to partially neutralize the residual acidic groups in the polyesters are preferably oil-soluble amines of low volatility such as mono-, di-, and triethanol amine, although water-soluble bases such as sodium hydroxide and other alkali metal hydroxides, carbonates, etc., can be used in the water phase so that they serve to partially neutralize the acid group in the polyester when water is added to the polyester mixture. Preferably the basic neutralizing agent is present in from about 0.25 to 3.5 parts by weight per 100 parts by weight of combined unsaturated polyester-copolymerizable monomer.

Most preferred emulsifiers for use in this invention are the non-ionic emulsifiers of one or more of the following classes:

mono and diglycerides of fat-forming fatty acids
sorbitan fatty acid esters
polyoxyethylene sorbitan fatty acid esters
polyoxyethylene sorbitol esters
polyethylene glycol esters
polyoxyethylene ethers
polyoxyethylene acids
alkyl phenoxypoly (ethyleneoxy) ethanols
polyoxyethylated fatty acids
coconut acid mono- and diethanolamine condensate
octylphenoxy ethanol
alkyl aryl ethers
alkyl aryl polyether alcohols
amino polyglycol condensates
modified polyethoxy adducts
alkyl benzyl polyethylene glycol ether
alkyl aryl polyether alcohols and organic sulfonates
lanolin derivatives
lecithin derivatives
soy phosphatides Preferably the non-ionic emulsifier is present in from about 1 to 3 parts by weight per 100 parts by weight of combined unsaturated polyester-copolymerizable monomer.

Useful promoters include aniline derivatives alone or with cobalt organic salts and as catalyst benzoyl peroxide, hydrogen peroxide or methyl ethyl ketone peroxide. Water-soluble dyes and oil-soluble dyes optionally can also be used as well as mineral or organic base pigments. The promoters are preferably present in from 0 to about 3 parts by weight per 100 parts by weight of combined unsaturated polyester-copolymerizable monomer mixture.

The invention is further illustrated in the following examples wherein the amounts of ingredients are given in parts by weight unless otherwise specified.

EXAMPLE I (A) A curable, olefinically unsaturated polyester resin prepared from phthalic anhydride, maleic anhydride and diethylene glycol having an acid number of 20–30 was dissolved in styrene in the weight ratio of 60% polyester resin to 40% styrene.

(B) A curable, olefinically unsaturated polyester resin prepared by the esterification-condensation of phthalic anhydride, maleic anhydride and propylene glycol having an acid number of 20–34 was dissolved in styrene in the weight ratio of 70% polyester resin to 30% styrene.

(C) A curable, olefinically unsaturated polyester resin prepared from phthalic anhydride, maleic anhydride, adipic acid and a mixture of ethylene glycol and diethylene glycol, having an acid number of 20 maximum, was dissolved in styrene in the weight ratio of 70% polyester resin to 30% styrene.

(D) A water-in-oil dispersion of polyester-monomer material (also herein referred to as "water-modified polyester" or "WMP") was prepared from the following ingredients:

| | Parts by weight |
|---|---|
| (A) (above) | 41 |
| (B) (above) | 59 |
| Colloidal pyrogenic silica | 1 |
| Diethyl aniline | 0.3 |
| Non-ionic emulsifying agent (octyl phenoxy polyethoxy ethanol) | 1.5 |
| Triethanol amine | 1.5 |
| Benzoyl peroxide | 1 |
| Water | 100 |

The mixture of all ingredients except benzoyl peroxide and water was stirred first for about 10 minutes with a mechanical stirrer. The benzoyl peroxide was then added and stirring was continued until all of the catalyst was dissolved in the resin (about 5 minutes). Then the water was added and mixing was continued until an emulsion resulted.

The emulsion formulation was poured into molds of various shapes and it gelled and solidified under ambient conditions to conform with the shape of the mold in about twenty minutes. The resulting castings were removed from the molds and they were found to be opaque and stonelike in appearance and very strong, having a flexural strength of 2300 p.s.i., a compressive strength of 2600 p.s.i. and a Shore A hardness of 98.

(E) Castings were also made from an emulsion like that described in D. except that the polyester composition to water weight ratio was 40:60, respectively.

(F) Castings were also made from an emulsion like that described in D. except that the polyester to water weight ratio was 60:40, respectively.

Separate castings prepared as described in D., E. and F. above were aged at room temperature, at 120° F., and at −8° C. for various periods of time and the percent water loss was determined. The results of these tests are given in Table I:

TABLE I

| | Weight percent water loss of WMP casting | | | | | | |
|---|---|---|---|---|---|---|---|
| | Room temperature | | | 120° F. | | | −8° C. |
| Days | D. | E. | F. | D. | E. | F. | F. |
| 2 | 1.23 | 2.5 | 1.1 | 3.9 | 7.38 | 2.33 | 0.11 |
| 7 | 2.8 | 5.6 | 2.3 | 6.8 | 14.6 | 5.6 | 0.22 |
| 12 | 3.7 | 7.21 | 2.9 | 10 | 18.3 | 7.8 | 0.28 |
| 20 | 4.8 | 9.2 | 3.1 | 13.5 | 22.6 | 9.39 | 0.43 |
| 29 | 6.04 | 11.4 | 4.5 | 16.3 | 26.4 | 10.7 | 0.58 |

It can be seen from examination of the figures in Table I that the water loss decreases with increasing amounts of polyester in the cured WMP casting and the water loss increases with increasing storage temperatures as one might expect. Although the water loss at 120° F. was 26.4% for casting E., the external aspects of the castings remained unchanged. The castings which lost appreciable amounts of water became lighter in weight, but this was the only noticeable change in physical properties. It is interesting to note that no cracking was observed in casting F. which was maintained at −8° C. even after several frost-defrost cycles.

EXAMPLE II

A water-modified polyester emulsion was prepared according to Example I(D) except that no catalyst (benzoyl peroxide) was included. This emulsion was stored at room temperature in the uncoated tin can at room temperature for about five months with no noticeable change.

The stability of this water-modified polyester resin was also determined at 100° F., 120° F. and 150° F.; and the results are given in Table II.

TABLE II

Resin stored at

| | ° F. |
|---|---|
| Gelled in 127 days | 100 |
| Gelled in 65 days | 120 |
| Gelled in 17 days | 150 |

It can be seen from the figures in Table II that the pot life of the resin depends upon the temperature of storage.

EXAMPLE III

Castings weighing about 30 g. each were prepared and cured according to the procedure of Example I(D). The linear and volumetric modifications and shrinkage measurements of the cured articles were determined over a period of ten days as they were subjected to an alternating storage cycle of 21 hours at room temperature and 3 hours at 150° F. each day. The results are given in Table III.

TABLE III

| Days of cycle | Shrinkage (percent) | | Loss (percent) | |
|---|---|---|---|---|
| | Linear | Volumetric | Thickness | Weight |
| 1 | 0.19 | 0.56 | 0.63 | 7.2 |
| 4 | 1.32 | 3.90 | 0.82 | 13.8 |
| 7 | 1.47 | 4.33 | 1.55 | 16.2 |
| 10 | 1.54 | 4.55 | 1.17 | 17.9 |

It can be seen that although there is some slight change in dimensions of the articles they can be considered as being dimensionally stable for all practical purposes.

EXAMPLE IV

Castings were prepared and cured in the form of panels according to (1) the procedure of Example I(D) and (2) the procedure of Example I(D) without the 100 parts of water. These cured castings were exposed to the influence of sun rays, rain and other weather variables by placing them out-of-doors in Southern California for about eight months. The castings were checked from time to time, and the results are given in Table IV.

TABLE IV.—OUTDOOR EXPOSURE OF CASTINGS

| | (1) | | (2) | |
|---|---|---|---|---|
| Length of time of exposure | Warpage | Length, inches | Warpage | Length, inches |
| 0 | No | 13.88 | No | 13.66 |
| 17 days | No | 13.86 | Yes | 13.66 |
| 24 days | No | 13.86 | Yes | 13.66 |
| 1 month | No | 13.86 | Yes | 13.64 |
| 8 months | No | 13.86 | Yes | 13.52 |

It can be seen that the weathered panel prepared from the WMP retained its external configuration better than the panel prepared from the polyester alone.

EXAMPLE V

A water-modified polyester emulsion was prepared from the following mixture:

| | Parts |
|---|---|
| Resin (A) from Example I | 20.5 |
| Resin (B) from Example I | 29.5 |
| Resin (C) from Example I | 50.0 |
| Colloidal pyrogenic silica | 0.5 |
| Non-ionic emulsifying agent (octyl phenoxy polyethoxy ethanol) | 1.5 |
| Dimethyl aniline | 0.3 |
| Triethanol amine | 2.0 |
| Cobalt octoate, 12% active | 1.0 |

The above mixture was emulsified with 80 parts of water and was catalyzed with the following solution:

| | Parts |
|---|---|
| Hydrogen peroxide, 30 vol. percent | 0.3 |
| Water-soluble methyl ethyl ketone peroxide | 0.15 |
| Water | 20 |

Flexible castings were obtained having a gel time of about 4-5 minutes.

EXAMPLE VI

A water-modified polyester casting was prepared using the procedure of Example I(D). An attempt was made to remove as much of the water in the casting as possible by aging at 150° F. The initial casting contained about 50% by weight of water. The results are given in Table V.

TABLE V

| Days at 150° F.: | Percent weight loss based on weight of original casting |
|---|---|
| 0 | 0 |
| 3 | 9 |
| 6 | 15 |
| 10 | 26 |
| 19 | 42 |
| 31 | 46.8 |
| 41 | 46.8 |
| 45 | 46.8 |

It can be seen from Table V that nearly all of the original water was removed from the casting after 45 days at 150° F. The casting after this treatment was unchanged in configuration and apparent physical properties except for weight loss.

EXAMPLE VII

The procedure of Example of I(C) was repeated using various amounts of benzoyl peroxide catalyst. The gel time, time to exotherm and peak temperature were determined at room temperature; and the results are given in Table VI.

TABLE VI

| Parts benzoyl peroxide | Gel time, minutes | Exotherm time, minutes | Peak temperature, °F. |
|---|---|---|---|
| 1 | 27 | 19 | 164 |
| 1.5 | 11 | 24 | 120 |
| 2 | 6 | 14 | 168 |

I claim:
1. In a curable water-in-oil emulsion comprising a mixture of
    (A) a mixture of an olefinically unsaturated polyester and styrene wherein the weight ratio of polyester to styrene is from about 50:50 to 75:25;
    (B) from about 1 to 3 parts by weight of a non-ionic emulsifier per 100 parts by weight of (A); and
    (C) from about 10 to 240 parts by weight per 100 parts by weight of (A) of water,
the improvement comprising also including in said emulsion
    (D) from about 0.25 to 4 parts by weight of (A) of a thixotropic thickener;
    (E) from about 0.25 to 3.5 parts by weight per 100 parts by weight of (A) of a basic neutralizing agent selected from the group consisting of monoethanol amine, diethanol amine, and triethanol amine;
    (F) from 0 to about 3 parts by weight of (A) of a promotor selected from the group consisting of diethyl aniline and dimethyl aniline alone or with a cobalt organic salt; and
    (G) a polymerization initiator selected from the group consisting of benzoyl peroxide, hydrogen peroxide, and methyl ethyl ketone peroxide.
2. The emulsion of claim 1 wherein (D) is silica.
3. The emulsion of claim 2 wherein the non-ionic emulsifying agent is octyl phenoxy polyethoxy ethanol.
4. The emulsion of claim 3 wherein (E) is triethanol amine.
5. The emulsion of claim 4 wherein (F) is diethyl aniline.
6. The emulsion of claim 5 wherein (G) is benzoyl peroxide.
7. The emulsion of claim 3 wherein (E) is dimethyl aniline plus cobalt octoate.
8. The emulsion of claim 7 wherein (G) is hydrogen peroxide.
9. The emulsion of claim 2 wherein there is included dyes or pigments.

References Cited

UNITED STATES PATENTS

| 3,078,249 | 2/1963 | Russell | 260—22 |
| 3,442,842 | 5/1969 | Bonin | 260—29.2 |

FOREIGN PATENTS

| 1,013,367 | 12/1965 | Great Britain | 260—22 |
| 1,040,828 | 9/1966 | Great Britain | 260—22 |
| 1,137,551 | 10/1962 | Germany | 260—22 |
| 6,714,220 | 4/1968 | Netherlands | 260—29.2 |

DONALD E. CZAJA, Primary Examiner

R. W. GRIFFIN, Assistant Examiner

U.S. Cl. X.R.

260—17.4 ST, 22 S, 23 P, 29.2 E, 29.6 WQ, 863, 864

UNITED STATES PATENT OFFICE
CERTIFICATE OF CORRECTION

Patent No. 3,629,169  Dated December 21, 1971

Inventor(s) Leon B. Bedighian

It is certified that error appears in the above-identified patent and that said Letters Patent are hereby corrected as shown below:

Column 1: Line 13, "water-oil" should be --water-in-oil--

Column 2: Line 7, "tetrahlorophathalic anhydride" should be --tetrachlorophthalic anhydride--

Column 2: Line 43, "4,,4'-isopropylidene" should be --4,4'-isopropylidene--

Column 3: Line 42, "The invention" should be --This invention--

Column 4: Table I, last column, first entry, "0.11" should be --0.12--

Column 4: Table I, last column, second entry, "0.22" should be --0.21--

Column 4: Line 55, "the uncoated tin" should be --an uncoated tin--

Column 5: Table III, fourth column, third entry, "1.55" should be --0.55--

In the claims:

Column 6: Lines 37-8, "of a promotor selected" should be --of a promoter selected--

Signed and sealed this 6th day of March 1973.

(SEAL)
Attest:

EDWARD M. FLETCHER, JR.  ROBERT GOTTSCHALK
Attesting Officer  Commissioner of Patents